March 20, 1962 J. M. SLATER ET AL 3,025,708
FREE-ROTOR GYROSCOPE MOTOR AND TORQUER DRIVES
Filed Dec. 19, 1958 4 Sheets-Sheet 1

INVENTOR.
JOHN M. SLATER
JOSEPH C. BOLTINGHOUSE
BY *Louis J. Knobbe*
AGENT

March 20, 1962     J. M. SLATER ET AL     3,025,708

FREE-ROTOR GYROSCOPE MOTOR AND TORQUER DRIVES

Filed Dec. 19, 1958     4 Sheets-Sheet 2

INVENTOR.
JOHN M. SLATER
JOSEPH C. BOLTINGHOUSE

BY

AGENT

March 20, 1962 J. M. SLATER ET AL 3,025,708
FREE-ROTOR GYROSCOPE MOTOR AND TORQUER DRIVES
Filed Dec. 19, 1958 4 Sheets-Sheet 3

INVENTOR.
JOHN M. SLATER
JOSEPH C. BOLTINGHOUSE
BY *Louis J. Knobbe*
AGENT

INVENTOR.
JOHN M. SLATER
JOSEPH C. BOLTINGHOUSE

BY

AGENT

United States Patent Office 3,025,708
Patented Mar. 20, 1962

3,025,708
FREE-ROTOR GYROSCOPE MOTOR AND
TORQUER DRIVES
John M. Slater, Fullerton, and Joseph C. Boltinghouse,
Whittier, Calif., assignors to North American Aviation,
Inc.
Filed Dec. 19, 1958, Ser. No. 783,644
6 Claims. (Cl. 74—5.46)

This invention relates to motor and torquer drives for use with free rotor gyroscopes.

The free rotor gyroscope makes use of a rotor supported on a spherical bearing (usually gas-lubricated) so as to have three degrees of angular freedom relative to the gyroscope support. The problem of driving the rotor of a free rotor gyroscope in order to maintain speed against viscous and windage drag is a quite different one from that in conventional gyros. Thus, the drive must accommodate a certain amount of rotor tilt rather than being adapted to operate about only a single axis. While allowing for a certain amount of rotor tilt, however, the drive must not introduce erratic or uncertain torques about axes other than the spin axis. Also, the conventional squirrel-cage induction motors and hysteresis synchronous motors widely used with conventional gyros utilize magnetic material mounted on the gyro rotor. The presence of such material on the rotor of a free rotor gyro is generally undesirable because of coercion (of an erratic nature) of the rotor to the case.

The problem of applying control torques to free rotor gyros is similar to some respects to that of providing the motor drive. There is no gimbal to push against, and it is difficult to apply to a whirling object a control torque especially a torque accurately predetermined as to magnitude and direction.

Free rotor gyro motor and torquer drives known in the prior art are exemplified by Patent No. 2,474,072 of G. H. Stoner, Patent No. 2,729,106 of J. C. Mathiesen, Patent No. 2,293,092 of B. A. Wittkuhns and Patent No. 2,785,573 of E. P. Bentley. The Stoner and Mathiesen patents illustrate reaction turbine drives using airjets. These drives require a source of compressed air; the exhausted air may be redirected by the case against the rotor, thereby causing error torques. Wittkuhns illustrates the use of a polyphase motor operating by induced eddy current effects on the periphery of a ball-shaped rotor. This drive is not very efficient because the magnetic circuit is not closed, i.e., the motor operates mainly on leakage flux. The torquing means illustrated by Wittkuhns in which eddy current drag forces are applied to the ball is open to the same objection. An inefficient motor drive is a particular handicap when, as is usually the case, it is desirable to run the rotor at high speed. This takes an excessive amount of electrical power in the Wittkuhns-type drive. Bentley discloses a motor drive in which the outer case is rotated, the rotor being driven by virtue of the viscous coupling between the rotor and case. This type of drive means is mechanically quite complicated, requiring a bearing for rotatably mounting the gyro case with respect to the base and in some cases slip rings for energizing torquing means located within the rotating case.

It is accordingly an object of this invention to provide an improved free rotor gyroscope.

It is also an object of this invention to provide an improved motor drive for free rotor gyroscopes.

It is another object of this invention to provide improved torquer drives for free rotor gyroscopes.

It is an additional object of this invention to provide free rotor gyro motor and torquer drives having higher torque efficiency than those known in the prior art.

Another object of this invention is to provide free rotor gyro motor and torquer drives adapted for use with a rotor operating at high speed.

A further object of this invention is to provide a motor drive for a free rotor gyro which introduces a minimum torque about axes other than the spin axis.

It is a further object of this invention to provide free rotor gyro motor and torquer drives which do not require the presence of any magnetic material on the rotor.

It is still another object of this invention to provide gyro motor and torquer drives which accommodate a certain amount of rotor tilt.

A further object of this invention is to provide free rotor gyro motor and torquer drives which are more accurate than those known in the prior art.

It is a further object of this invention to provide free rotor gyro motor and torquer drives which require minimum structural elements.

It is still another object of this invention to provide free rotor gyro motor and torquer drives which permit the case surrounding the rotor to be rigidly affixed to the gyro base.

It is a further object of this invention to provide free rotor gyro torquers which are not affected by relatively large variations in the rotor velocity.

A further object of this invention is to provide free rotor gyro motor and torquer drives which do not require any current conductive paths between the gyro rotor and case.

Other and further objects, features and advantages of the invention will become apparent as the description proceeds.

According to the present invention, we provide a motor drive and torquer for a free rotor gyro of the electrical type, thereby avoiding the stated disadvantages of air motors while being of much higher efficiency than the leakage-flux type of torquer drive. Our motor drive involves the provision on the rotor of a thin conductive sleeve or shell which may be cylindrical or some other figure of revolution about the spin axes. The sleeve is disposed within the gap of a polyphase stator of which the magnetic path is completed by a magnetic member spaced as closely as possible to the conductive sleeve while preserving the necessary small tilt freedom for the rotor. We have attacked the torquer problem in a similar way and thus provide a conductive sleeve or shell on the rotor in conjunction with a fixed set of electromagnets, differentially energized, opposed to a closely-spaced flux return member.

A more thorough understanding of the invention may be obtained by the study of the following detailed discussion taken in conjunction with the accompanying drawings in which.

Figure 1:
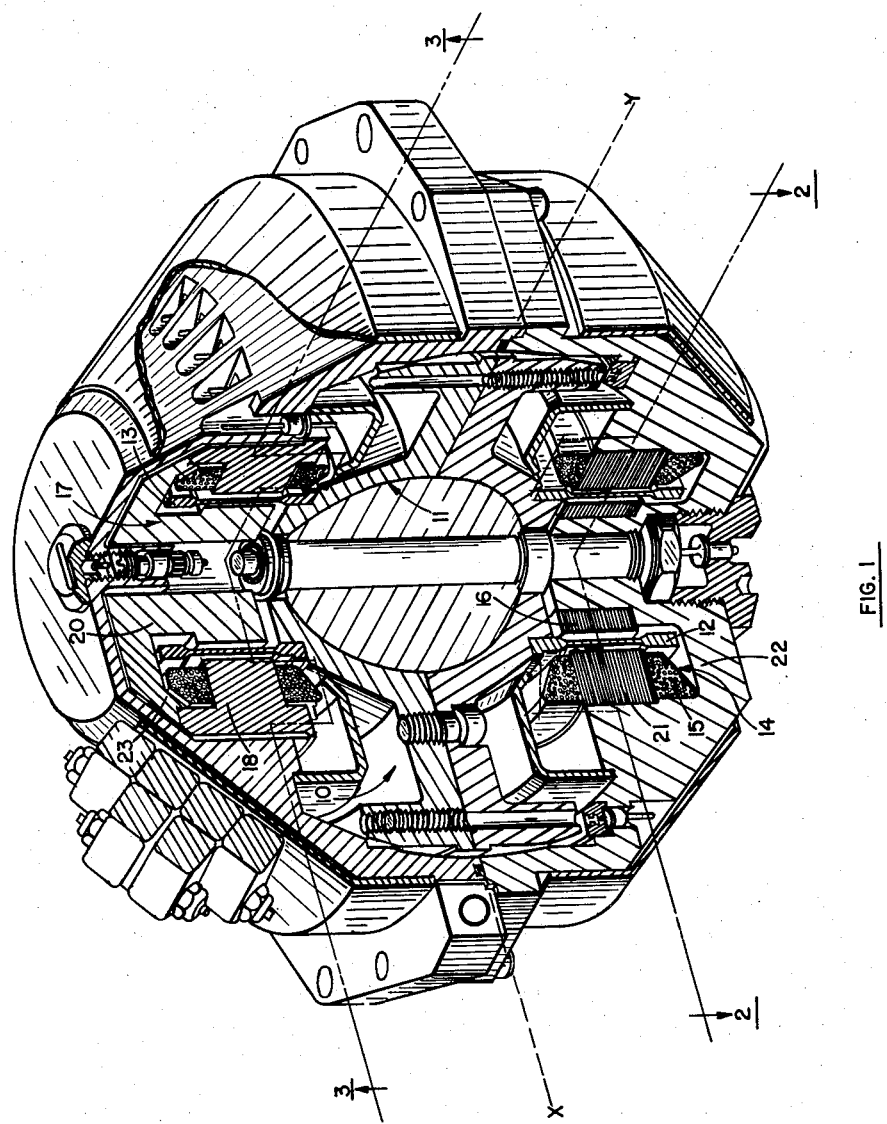
FIG. 1 is a cut-away perspective view of one embodiment of this invention in which the motor and torquer sleeves are generally cylindrical in shape.

FIG. 1 shows the invention as embodied in a free rotor gyroscope upon which has been filed patent application, Serial No. 641,720, entitled "Free Rotor Gyroscope," filed February 21, 1957, by D. B. Duncan et al. and assigned to North American Aviation, Inc., assignee of the present invention. The rotor 10 is supported on a self-lubricated ball-type bearing at 11. Attached to opposite ends of rotor 10 by any convenient means, e.g., a shrink fit, are respective cylindrical motor sleeve 12 and cylindrical torquer sleeve 13. The cylindrical shells comprising motor sleeve 12 and torquer sleeve 13 may be constructed of any material having a suitable electrical conductivity. It has been found preferable to construct motor sleeve 12 of copper for the sake of high conductivity, and torquer sleeve 13 of a material such as Manganin and Constantan, alloys comprised of copper, manganese and nickel which change very little in resistance with temperature. An alloy of gold with two percent chromium may also be used. Such alloys have relatively low conductivity but this is no disadvantage for the torquer.

Figure 2:
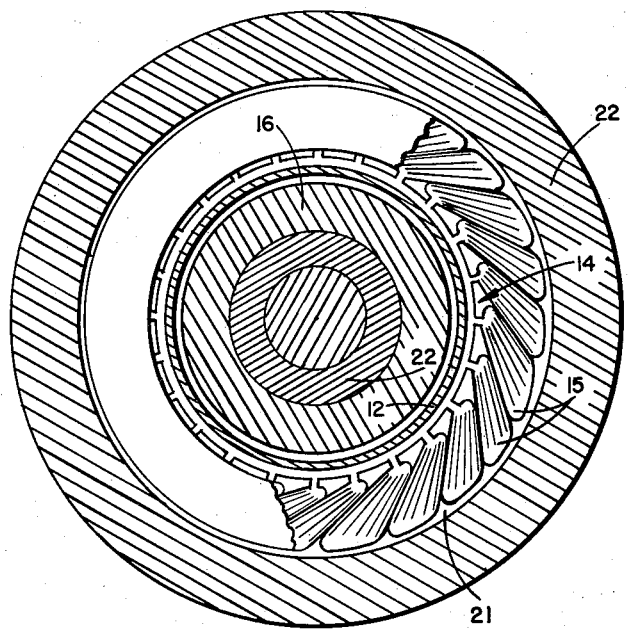
FIG. 2 is a horizontal section along the line 2—2 of FIG. 1.

Referring to FIGS. 1 and 2, the motor stator 14 includes a cylindrical core 21 fixedly mounted on the gyro case 22 and preferably constructed of laminated silicon steel for reducing eddy current losses. Windings 15 are mounted in suitable slots on the inner periphery of core 21. They are encased in a suitable potting compound, thus forming the smooth contoured stator surfaces shown in FIGS. 1 and 2. The smooth contours of the molded stator provide geometrical symmetry and thus reduce aerodynamic torque effects on the rotor. The motor stator windings 15 are commonly arranged for three-phase power supply, with three sets of exactly similar multipolar coil groups spaced one-third of a pole pitch apart. The superposition of the three stationary, but alternating, magnetic fields produced by the three-phase windings produces a sinusoidally distributed magnetic field revolving in synchronism with the power supply frequency. A ring 16, which is also preferably constructed of laminated silicon steel, is fixedly mounted to the gyro case 22 so as to lie inside the copper motor sleeve 12 for providing a flux path for the rotating magnetic field. The motor torque is the result of eddy currents generated in the copper sleeve 12 attached to the rotor 10.

Figure 3:
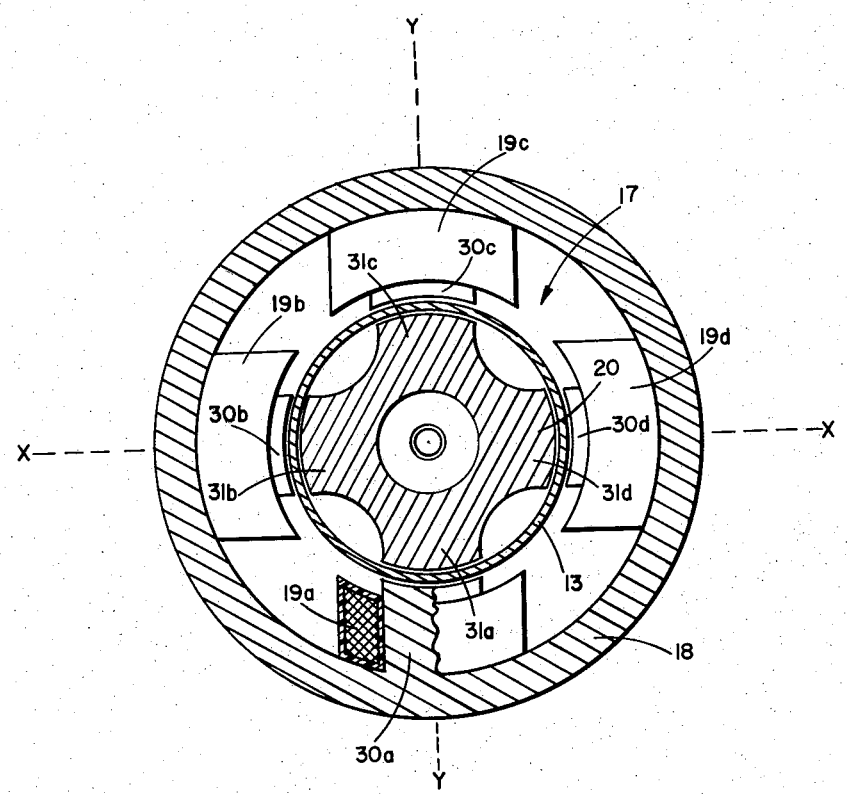
FIG. 3 is a horizontal section along the line 3—3 of FIG. 1.

The free-rotor gyro torquer 17, shown in FIGS. 1 and 3, comprises an outer ring 18 having four integral protruding poles 30a, 30b, 30c and 30d. Upon these poles are wound respective coils 19a, 19b, 19c and 10d. As shown in the cut-away view of coil 19a, each of the coils are encased in a suitable potting compound. A centrally mounted inner pole member 20 also includes four integral protruding poles 31a, 31b, 31c and 31d, each mounted in an opposed position with a respective one of the poles 30a-30d. The pole members 18 and 20 may be constructed of soft iron; however, it is preferable that they be constructed of a very low hysteresis material such as that known in the trade as Mu-Metal. As illustrated in the cutaway view of FIG. 1, the centrally located inner pole member 20 has an integral extension 23 which joins the ring 18. These members may be affixed to each other by cementing them together with Epon cement. Located between the pole members 18 and 20 is the torquer sleeve 13 which, as in the case of the motor sleeve, freely rotates with the rotor and has a limited tilt freedom.

In operation a current in one of the coils 19a—19b produces a magnetic flux through the torquer sleeve 13 to the inner pole member 20. Because the rotor 10 is turning the torquer sleeve 13 through this magnetic field a drag forced due to eddy currents occurs on the sleeve 13 at a point under the magnet pole face. By virtue of the four-torquer coils 19a through 19d, and the four projecting poles on both the inner and outer pole members, four regions are provided at which the flux may be concentrated through the shell of the torquer sleeve. The 90° spacing of the flux concentrating poles permits torquing in either direction about either of two orthogonal transverse axes. Thus, if torquer coils 19a and 19c are equally energized, no net precession moment exists. If current is increased in coil 19a, and reduced in coil 19c, a net moment appears about the Y axis, due to increased drag effect at the pole comprising torquer coil 19a. Because of the gyroscope's property of precession, a torque applied about axis Y, causes a precession of the rotor 10 at a proportional rate about axis X. Similarly, differential torques may be generated by torquer windings 19b and 19d simultaneously with a differential torque generated by windings 19a and 19c so as to cause a net precession about any axis perpendicular to the spin axis. The two torquing forces generated by the torquer coils 19a, 19b, 19c and 19d are commonly adjusted so that they are equal and opposite to constant error torques due to the earth's motion and to the electrical and mechanical imperfections in the gyro itself. In this manner, gyro errors due to such error torques may be minimized.

As shown in FIG. 1, the motor sleeve and torquer sleeve are mounted on opposite sides of the gyro rotor. This symmetrical construction is desirable since it results in a balanced configuration for the gyro rotor. With the exception of devices such as gyro pendulums in which the rotors are deliberately unbalanced, it is usually essential that the rotating member be balanced precisely radially, axially and dynamically.

Figure 4:
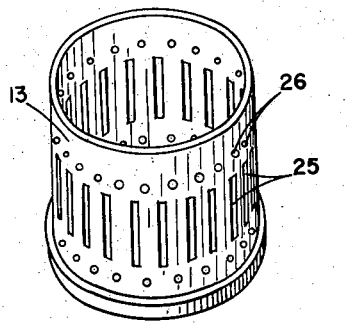
FIG. 4 is a view in perspective of one embodiment of the sleeve-type member used in both the gyro motor and torquer.

It may seem surprising that the sleeve-type construction shown for both the motor and torquer drives is operable; one might suspect that gas-bearing effects in the gaps between the sleeves and the stationary elements would cause excessive coercion of the rotors to the case. Actually, by keeping the gaps reasonably wide—of the order of 0.015 inch—the coercion from this source is no greater than that introduced in the spherical bearing itself and by other elements in the system. Further, the coercion caused by the sleeve construction may be made even smaller by perforating or grooving the sleeves so as to minimize hydrodynamic "lift," i.e., to make these sleeves as ineffective as possible for functioning as gas bearings. This type of construction is illustrated in FIG. 4 wherein is shown an enlarged view of torquer sleeve 13. A plurality of grooves or slots 25 are formed in the walls of the cylindrical shell. Motor sleeve 12 may be of identical construction to that of the torquer sleeve 13, illustrated in FIG. 4. However, since the two sleeves may be constructed of different materials having slightly different masses, a plurality of holes 26 are provided in the torquer sleeve 13, the heavier of the two members, to equalize the masses of the two sleeve members in order to maintain the balance of the rotor 10.

The motor and torquer means heretofore described provide an efficient driving and torquing means for a free rotor gyro since they do not depend upon leakage flux for producing the torques. Rather, both the motor and torquer are provided with a closely-spaced flux return member which affords a good magnetic flux path and has high electromagnetic efficiency. By way of illustration, in a typical autonavigator gyroscope of angular momentum of 1 to $10 \times 10^6$ cgs. units, the maximum electrical input to our torquer is only 1 or 2 watts.

A feature of the gyro torquer shown and described above is that it is relatively insensitive to changes in the velocity of rotor 10. The characteristics of the gyro are such that the relation between the angular velocity of precession and the torque applied is defined as follows:

$$T = \Omega H \tag{1}$$

where T is the applied torque, H is the angular momentum of the gyro rotor, and $\Omega$ is the angular velocity of precession. The angular momentum, H is defined as:

$$H = \omega I \tag{2}$$

where $\omega$ is the angular velocity of the gyro rotor and I is the moment of inertia of the gyro rotor. For gyro torquers heretofore utilized the applied torque T was a function of the applied current or:

$$T = Ki \tag{3}$$

where K is a constant determined by the efficiency of the torquer and $i$ is the current applied to the torquer. Combining Equations 1, 2 and 3 gives:

$$\Omega = \frac{Ki}{I\omega} \quad (4)$$

The angular velocity of precession of the prior art gyroscopes is thus seen to be inversely proportional to the spin velocity of their rotors. For highly accurate gyroscopes this relationship requires that the rotor speed be held constant to one part in 100,000.

In the torquer of this invention, however, the applied torque T is not merely $Ki$ but a function of the eddy currents generated in the torquer sleeve 13. These eddy currents are a function of the rotor velocity or:

$$T = K'i\omega \quad (5)$$

Combining Equations 1, 2 and 5 gives:

$$\Omega = \frac{K'i}{I} \quad (6)$$

Neglecting second order and higher effects, the angular velocity of precession is independent of the rotor velocity. In practice accuracy equivalent to the aforementioned 1 part in 100,000 is obtained with a speed control of only 1 part in 100.

A significant corollary of the decreased speed control requirements is that the gyro motor may use a copper sleeve. Although the resistivity of copper changes with temperature enough to effect the rotational velocity of the rotor 10, the relative insensitivity of the torquer to rotor velocity changes enables the use of this material without bringing in need for accurate temperature control. The use of copper in the motor is preferred because of its high conductivity which produces a more efficient motor with associated lower input power requirements. Other materials having substantially zero change in resistivity over wide temperature variations, e.g., Manganin and Constantan, are specified for the torquer sleeve so as to maintain the torquer scale factor constant with temperature changes.

Figure 5:
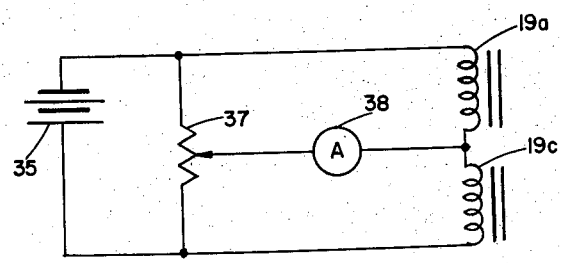
FIG. 5 is a schematic of a circuit adapted for energizing the torquer of this invention.
Figure 5:
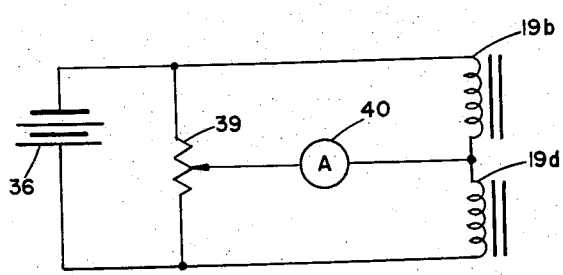

A torquing circuit for the herein disclosed free rotor gyro torquer is illustrated in FIG. 5. Fixed direct current supplies 35 and 36 provide the bias current. Supply 35 is connected in a push-pull circuit to the torquer coils 19a and 19c. Variable potentiometer 37 allows the current in the torquer coils 19a and 19c to be adjusted to any desired difference relationship. This difference can be read on an ammeter 38 in series with the current fed to both coils as indicated. Similarly variable potentiometer 39 is used to adjust the current in torquer coils 19b and 19d to any desired difference relationship. This difference can be read on an ammeter 40 in series with the current fed to both coils as indicated.

The operation of the torquing circuit shown in FIG. 5 is as follows: if we have equal currents in windings 19a and 19c there will be no net torque acting on the gyro rotor about the Y axis. A greater current in one winding will result in a rotor torque about the Y axis, the direction of this torque depending on which winding has the greater current. The torque generated is proportional to the product of the flux density and the eddy current in the torquer sleeve. Since the eddy current itself is proportional to the flux density, the resultant torque is proportional to the square of the flux density or to the square of the current in each coil winding. Thus, the resultant torque from windings 19a and 19c is proportional to the magnitude of the difference of the squares of the current in the two windings. By adjustment of the potentiometer 37, a constant torque of the desired direction and magnitude can be generated. Similarly, windings 19b and 19d have identical control circuitry and operate in the same manner. The two torquing forces generated by the windings 19a, 19b, 19c, 19d can be adjusted so as to apply the proper controlled torques to the gyroscope.

The gyro torquer of this invention is adapted for energization by other circuits known in the art; the circuit illustrated in FIG. 5 and heretofore described is by way of example only and our invention is not limited thereto.

Figure 6:
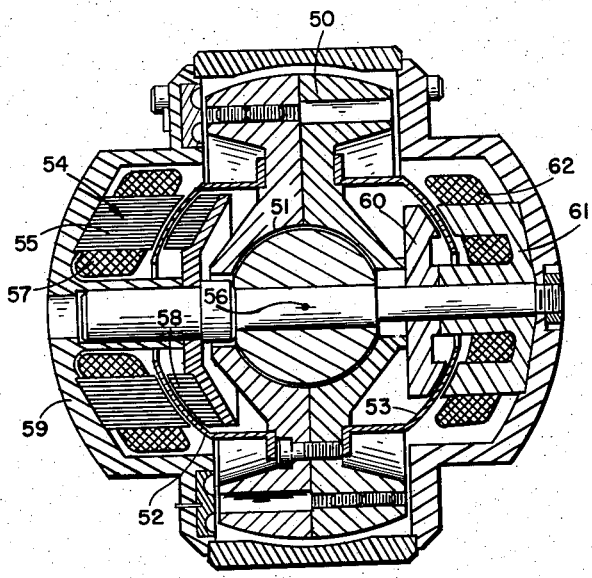
FIG. 6 is an elevation cross section of another embodiment of this invention in which the motor and torquer sleeves are generally spherical in shape.

In FIG. 6 is illustrated a further embodiment of this invention. The rotor 50 and self-lubricated ball-type bearing structure 51 may be identical to that shown in FIG. 1 and in the co-pending application, Serial No. 641,720, entitled "Free Rotor Gyroscope." The motor and torquer structure shown in FIG. 6 are of interest, however, in that the motor and torquer sleeves respectively denoted as 52 and 53 have spherical rather than cylindrical contours. Moreover, these contours are designed to have the center of their radius of curvature at the rotor center 56. The motor stator 54 comprises a core 55, affixed to the gyro case 59, having its face machined to form a spherical contour, the center of its radius of curvature also lying at the rotor center 56. Windings 57 mounted in slots of the core 55 are arranged to produce a revolving magnetic field when energized from three-phase power supply. The flux return member 58 affixed to the gyro case 59 is similarly machined so as to provide a spherical contour having the center of its radius of curvature at center 56. The core 55 and flux return member 58 are preferably constructed of laminated silicon steel. The spherically contoured motor sleeve 52 is preferably constructed of copper and is attached to the rotor 50 by any convenient means.

The torquer members of the free rotor gyroscope shown in FIG. 6 likewise provide closely opposed members having spherically contoured faces. As in the prior embodiment the inner and outer members respectively denoted as 60 and 61 are affixed to the gyro case 59 and are each provided with four projecting opposed pole faces. Suitable windings 62 are wound upon the poles formed integrally with the member 61. The four pole faces on both the inner and outer members are machined so as to form the zone of a sphere centered at the rotor center 56. As in the previous embodiment of the gyroscope, both the inner and outer members 60 and 61 are preferably machined from the alloy known as Mu-Metal. The torquer sleeve 53 is made integral with the rotor by any convenient means and located on the opposite side of the rotor from the motor sleeve. The sleeve members are substantially identical with the exception that the torquer sleeve 53 is preferably composed of a material such as Manganin.

The operation of the gyro shown in FIG. 6 is substantially equivalent to that of the gyro previously shown in FIG. 1. The polyphase stator 54 drives the rotor 50 via induced eddy currents in the motor sleeve 52. Control moments are applied by differentially energizing the four poles of the torquer so as to induce eddy currents in selective portions of the spherical torquer sleeve 53. The advantage to be derived from the torquer and motor construction shown in FIG. 6 is that any possible coercion between the sleeves and the adjacent motor and torquer members is reduced to a negligible value since tilt of the rotor 50 relative to the gyro case 59 does not vary the gaps between the torque-applying sleeves and the stationary elements. This, of course, follows from the fact that each of the sleeve and closely opposed stationary members take the form of zones of concentric spheres centered at the rotor center.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A gyroscope comprising in combination; a support; a gyroscope rotor; self-lubricated fluid bearing means located between said rotor and said support for supporting said rotor for rotation about a spin axis with three degrees of angular freedom relative to said support; a motor drive for said rotor comprising an inner magnetic cylindrical ring fixedly mounted to said support so that its longitudinal axis is substantially coincident with said spin axis, a copper shell subsantially cylindrical in shape circumferentially surrounding said magnetic ring and fixedly mounted to one end of said rotor for rotation about said spin axis, a substantially cylindrical core circumferentially surrounding said copper shell and fixedly mounted on said support so that its longitudinal axis is substantially coincident with said spin axis, and motor windings mounted on said core adapted for generating a magnetic field rotating about said spin axis; and a torquer drive for said rotor comprising an inner pole member having four symmetrical poles, positioned about the outer periphery of said pole member at 90° intervals, said inner pole member being fixedly mounted to said support so that said poles are substantially symmetrical about said spin axis at a position with respect to the gyrcoscope rotor substantially opposite that of the inner magnetic ring of said motor drive, a Manganin shell substantially cylindrical in shape circumferentially surrounding said inner pole member and fixedly mounted to the end of said rotor opposite the end to which said copper shell is mounted, for rotation about said spin axis, an outer pole member fixedly mounted on said support so as to circumferentially surround said Manganin shell, said outer pole member having four inwardly projecting symmetrical poles positioned at 90° intervals located opposite respective poles of said inner pole member, and torquer windings mounted on each pole of said outer pole member.

2. The gyroscope of claim 1 wherein both said copper and Manganin shells have a plurality of slots in their walls parallel to the longitudinal axis of said shells.

3. In a free-rotor gyro having a rotor and a case and including means for supporting said rotor for three degrees of angular freedom relative to said case, a first cylindrical conductive shell located on one side of and integral with said rotor and being a figure of revolution about the spin axis of said rotor, a polyphase electric motor stator attached to said case and having a plurality of poles closely opposed to one side of said first shell, and a first flux return member closely opposed to the other side of said first shell to concentrate the magnetic flux through the shell, a second cylindrical conductive shell similar in shape and weight to said first shell located opposite of said first shell and integral with said rotor and being a figure of revolution about the spin axis, said first and second shells being symmetrically positioned about the center of said rotor, one or more magnets mounted on said case closely opposed to one side of said second shell, and second flux return means closely opposed to the other side of said second shell to concentrate the magnetic flux through second shell.

4. A free-rotor gyro as defined in claim 3 wherein said first conductive shell is composed of copper and said second conductive shell is composed of metal of low thermal resistivity coefficient, said shells having a plurality of slots in their walls.

5. A free-rotor gyro as defined in claim 4 wherein one of said shells has a plurality of holes in its walls so as to equalize the weights of the two shells.

6. In a free rotor gyro having a rotor and a case, and including means for supporting said rotor for rotation about a spin axis with three degrees of angular freedom relative to said case, electromagnetic torque applying means for said rotor comprising an inner pole member having four symmetrical poles positioned about the outer periphery of said pole member at 90° intervals, said inner pole member being fixedly attached to said case with said poles arranged substantially symmetrically about said rotor spin axis, a shell substantially cylindrical in shape circumferentially surrounding said inner pole member and fixedly attached to said rotor for rotation therewith, said shell having a plurality of slots therein parallel to the longitudinal axis of said shell, an outer pole member fixedly mounted on said case, said outer pole member circumferentially surrounding said shell, said outer pole member having four inwardly projecting symmetrical poles positioned at 90° intervals opposite respective poles of said inner pole member, and a separate torquer winding mounted on each pole of said outer pole member.

References Cited in the file of this patent

UNITED STATES PATENTS

| | | |
|---|---|---|
| 2,527,245 | Cunningham et al. | Oct. 24, 1950 |
| 2,641,132 | Barkalow | June 9, 1953 |
| 2,653,257 | Sailer | Sept. 22, 1953 |
| 2,729,106 | Mathiesen | Jan. 3, 1956 |
| 2,797,581 | Carter | July 2, 1957 |